United States Patent [19]

Nielsen et al.

[11] Patent Number: 5,084,658
[45] Date of Patent: Jan. 28, 1992

[54] MOTOR SPEED CONTROL SYSTEM FOR AN ELECTRICALLY POWERED VEHICLE

[75] Inventors: Bruce A. Nielsen, Painesville; William Pickering, University Heights, both of Ohio

[73] Assignee: Caterpillar Industrial Inc., Mentor, Ohio

[21] Appl. No.: 676,026

[22] Filed: Mar. 27, 1991

[51] Int. Cl.$^5$ ............................................. H02P 7/29
[52] U.S. Cl. ................................... 318/139; 318/599; 318/257
[58] Field of Search ............... 318/139, 256, 257, 258, 318/259, 260, 261, 262, 263, 268, 269, 270, 271, 273, 274, 276, 599

[56] References Cited

U.S. PATENT DOCUMENTS

| | | | |
|---|---|---|---|
| 3,575,648 | 4/1971 | Ridding | 318/106 |
| 3,757,180 | 9/1973 | Subler | 318/139 |
| 3,764,870 | 10/1973 | Morton et al. | 318/139 |
| 3,818,291 | 6/1974 | Miyake | 318/139 |
| 3,936,707 | 2/1976 | Yoshida et al. | 318/139 |
| 4,068,153 | 1/1978 | Artrip et al. | 318/373 |
| 4,211,965 | 7/1980 | Toyama et al. | 318/139 X |
| 4,217,527 | 8/1980 | Bourke et al. | 318/139 |
| 4,240,015 | 12/1980 | White | 318/139 X |
| 4,423,362 | 12/1983 | Konrad et al. | 318/139 |
| 4,471,273 | 9/1984 | Melocik et al. | 318/55 |
| 4,500,820 | 2/1985 | Noto et al. | 318/139 |
| 4,511,947 | 4/1985 | Melocik et al. | 361/191 |
| 4,514,665 | 4/1985 | Melocik et al. | 318/139 |
| 4,518,902 | 5/1985 | Melocik et al. | 318/373 |
| 4,529,919 | 7/1985 | Melocik et al. | 318/373 |
| 4,555,651 | 11/1985 | Melocik et al. | 318/139 X |
| 4,580,083 | 4/1986 | Omae et al. | 318/139 X |
| 4,675,585 | 6/1987 | Krueger et al. | 318/139 X |
| 4,772,829 | 9/1988 | Pickering et al. | 318/139 |
| 4,814,675 | 3/1989 | Perilhon | 318/599 X |

Primary Examiner—Bentsu Ro
Attorney, Agent, or Firm—David M. Masterson

[57] ABSTRACT

A motor speed control system for a vehicle is provided. The control system includes an electric motor connected to a power coupling element for delivering electrical energy to the motor in response to a control signal. A sensor produces a current signal in response to the magnitude of the current flowing through the motor. An accelerator pedal produces a command signal in response to a desired vehicle speed. A microprocessor receives the command signal and responsively delivers a pulse width modulated control signal to the power coupling element. The control signal has a duty cycle in a range between a minimum and predefined value. Additionally, the microprocessor receives the current signal and increases the duty cycle of the control signal by a predetermined amount beyond the predefined value in response to the received current signal.

18 Claims, 3 Drawing Sheets

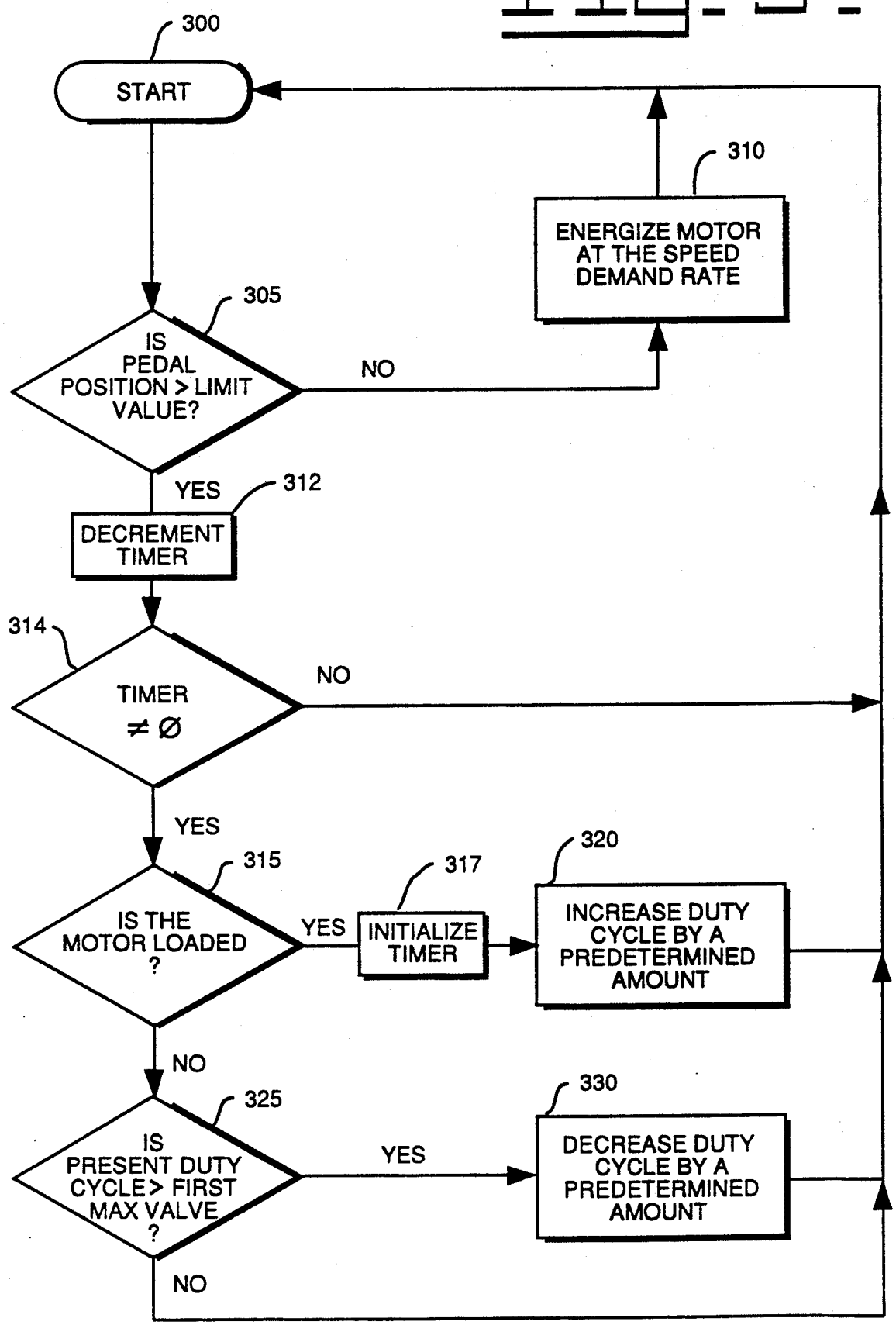

MOTOR SPEED CONTROL SYSTEM FOR AN ELECTRICALLY POWERED VEHICLE

DESCRIPTION

1. Technical Field

This invention relates generally to a motor speed control system for an electrically powered vehicle and more particularly to a motor speed control system for an electrically powered vehicle wherein an electric motor is controllably energized in response to the magnitude of the electrical current flowing through the motor being greater than a predetermined value.

2. Background Art

It is desirable to control the speed of electrically powered vehicles. For example, an owner of a fleet of vehicles which operate in confined spaces, such as a warehouse, may find it useful to limit the speed of the vehicles to a maximum speed. The limited speed allows the operators of the vehicles to maneuver around the warehouse with greater stability.

Devices which control the maximum speed of electrically powered vehicles are well-known. Typically, fleet owners may simply have the accelerator pedal of the vehicle blocked or obstructed in some manner so the operator will not be able to depress the accelerator pedal beyond a given point corresponding to a maximum speed. One problem with blocking the accelerator pedal is when the electrical motor is heavily loaded the vehicle may stall. For example, the operator may be guiding the vehicle up an incline or a ramp. The incline causes the loading on the motor to increase. Since only a fixed amount of energy is supplied to the electric motor due to the limited accelerator pedal position, the truck may stall. In another example, the vehicle may have inadvertently been guided into a small hole or a pot-hole. With only a certain amount of energy being delivered to the vehicle, the vehicle may not be able to pull out of the hole.

One solution to this problem would be to employ a speed sensor or an RPM sensor on the electric motor. In this way the speed of the vehicle can be monitored and more energy can be delivered to the electric motor in a heavy loading condition. However, this type of sensor is expensive and would require modifications to the existing electrical circuitry. This would significantly add to the overall cost of the vehicle. Furthermore, with the added components, the reliability of the vehicle would be degraded.

It is desirable to control the speed of an electrically powered vehicle under all conditions including a heavy loading condition. Moreover it is desirable to provide a speed control without adding to the circuitry already provided and without adding to the overall cost of the vehicle.

The present invention is directed to overcoming one or more problems as set forth above.

DISCLOSURE OF THE INVENTION

In one aspect of the present invention, a motor speed control system for a vehicle is provided. The control system includes an electric motor connected to a power coupling element for delivering electrical energy to the motor in response to a control signal. A sensor produces a current signal in response to the magnitude of the current flowing through the motor. An accelerator pedal produces a command signal in response to a desired vehicle speed. A microprocessor receives the command signal and responsively delivers a pulse width modulated control signal to the power coupling element. The control signal has a duty cycle in a range between a minimum and predefined value. Additionally, the microprocessor receives the current signal and increases the duty cycle of the control signal by a predetermined amount beyond the predefined value in response to the received current signal.

BRIEF DESCRIPTION OF THE DRAWINGS

For a better understanding of the present invention, reference may be had to the accompanying drawings, in which:

FIG. 3 illustrates a flowchart representation of one embodiment of the software of the present invention.

BEST MODE FOR CARRYING OUT THE INVENTION

Figure 1:
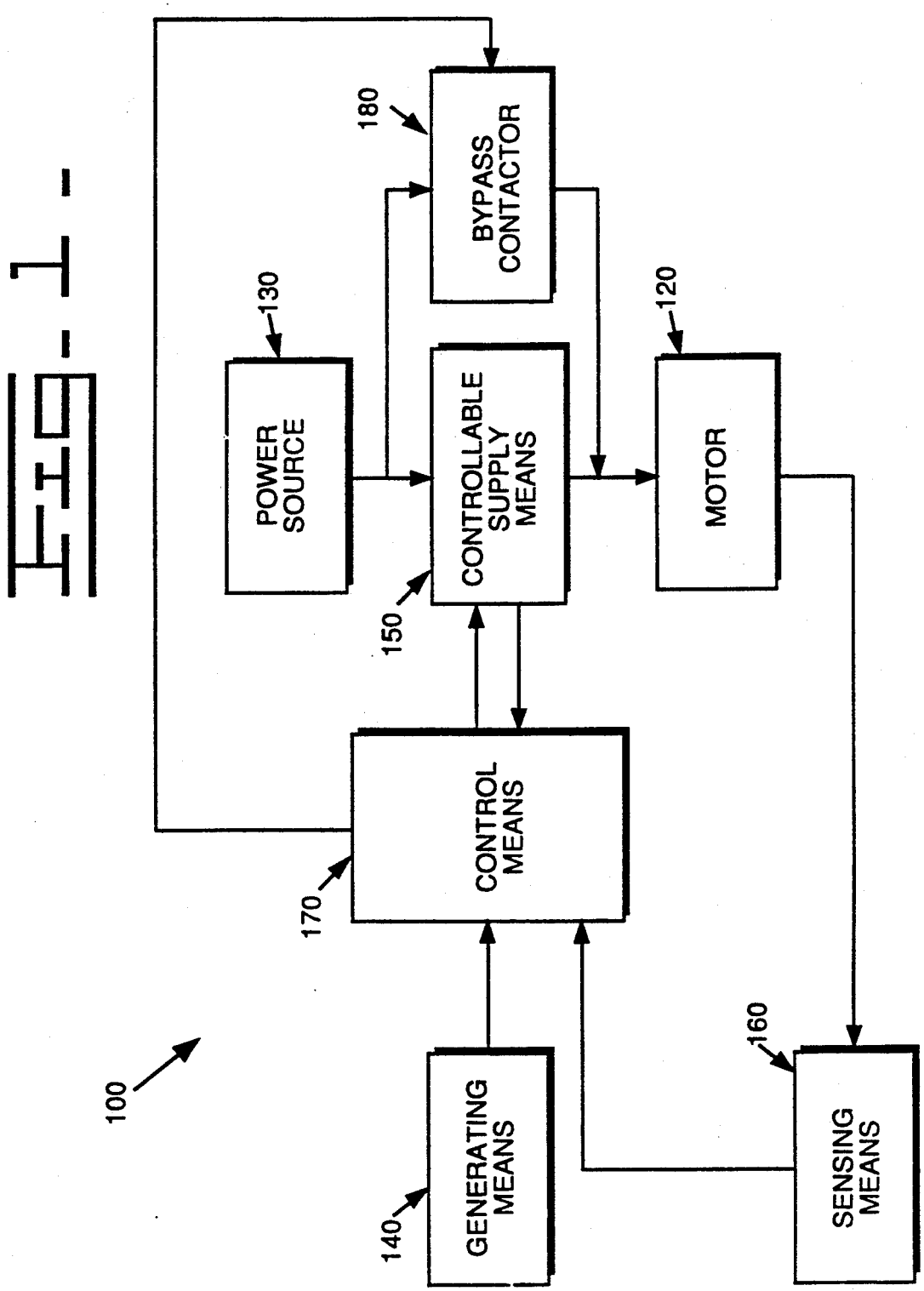
FIG. 1 illustrates a block diagram of one embodiment of the present invention.

Referring now to the drawings, wherein a preferred embodiment of a control system 100 is shown, FIG. 1 is a block diagram of the present control system 100 for controlling the supply of power to a motor 120 for a vehicle. The control system 100 is designed to control the speed of the motor 120, and thus the speed of the vehicle. Consequently, the control system 100 includes a power source 130, and a generating means 140 for producing a command signal in response to a desired vehicle speed. The control system 100 also includes a controllable supply means 150, coupled to the motor 120, for delivering electrical energy to the motor 120 in response to a control signal. A sensing means 160 for producing a current signal in response to the magnitude of the current flowing though the motor 120 being greater than a predetermined value is also provided.

Advantageously, the control system 100 includes a control means 170 for receiving the command signal and responsively delivering a pulse width modulated control signal to the controllable supply means 150.

The control system 100 further includes a bypass contactor 180 provided to shunt the supply means 150 and connect the power source 130 directly to the motor 120 during high power operation. The control means 170 also acts to control the bypass contactor 180. Operation of the bypass contactor 180 normally occurs after an operator requests full speed operation via the generating means 140.

Figure 2:
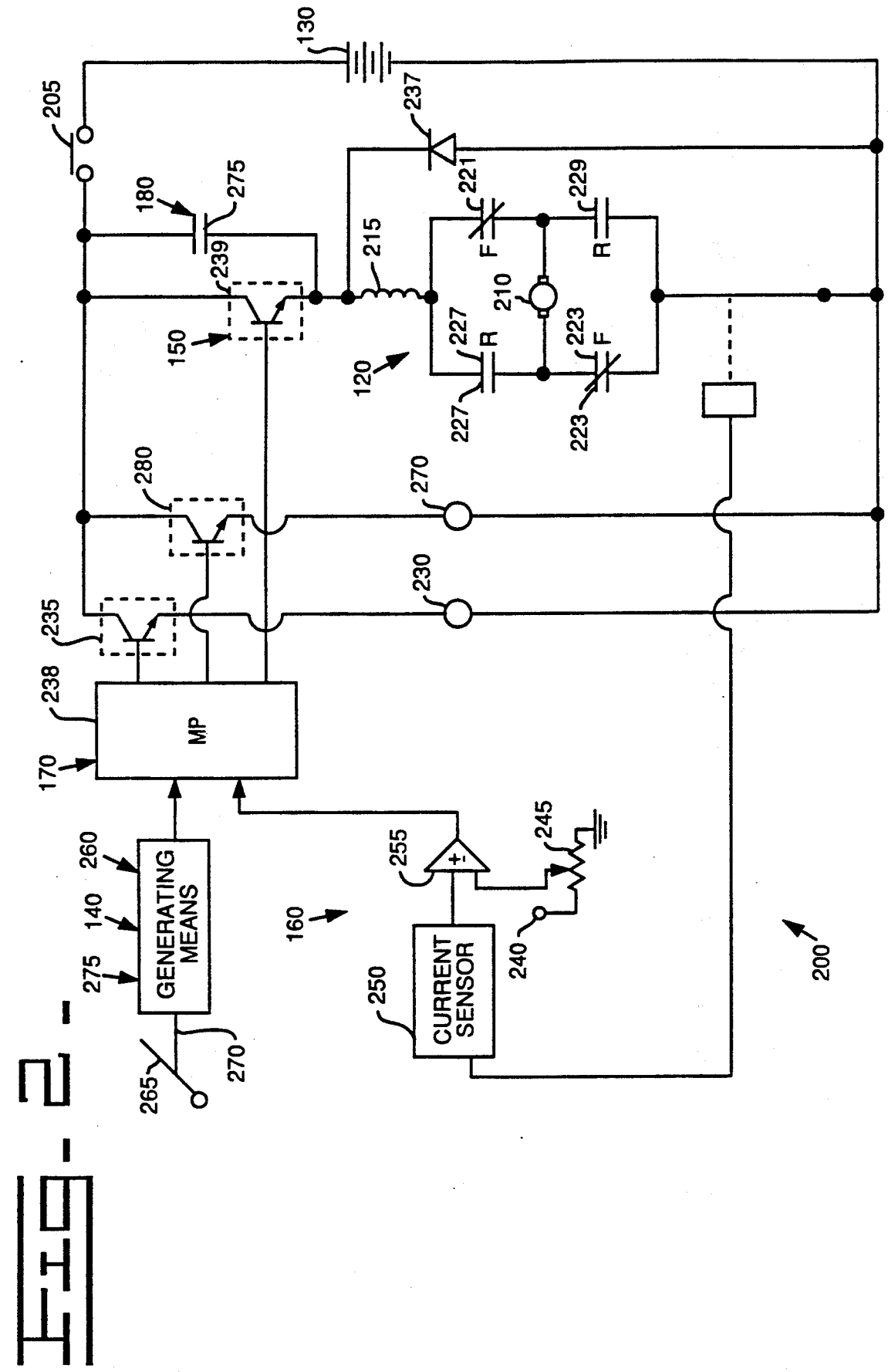
FIG. 2 illustrates a schematic illustration of an overall motor control system incorporating the present invention.

FIG. 2 shows the control system 100, including the generating means 140, the controllable supply means 150, the bypass contactor 180, the control means 170, and the sensing means 160, as part of an overall motor control system shown generally as 200. The principles of the present invention can also be applied to simultaneous control of a plurality of motors which those skilled in the art can readily appreciate.

The motor control system 200 includes the power source 130, such as a vehicle battery, that supplies power to the motor 120 through a normally open line contact 205. The line contact 205 is typically energized upon actuation of a vehicle key switch (not shown) and provides power to the electric drive system. The motor 120 includes an armature 210 and a field winding 215 that are connected in series.

The motor 120 also includes normally open forward contacts 221 and 223, together with normally closed reverse contacts 227 and 229. The contacts 221,223,227,229 determine the direction of energization of the motor 120. A directional contactor coil 230, which controls the state of the contacts 221,223,227,229, and a directional power transistor 235 controlled by the control means 170 is provided. The directional power transistor 235 is in series connection with the power source 130. When the transistor 235 is energized upon control of the control means 170, the coil 230 energizes to change the state of the contacts 221,223,227,229 from that shown. When the transistor 235 is deenergized, the coil 230 deenergizes to return the contacts 221,223,227,229 to the normal state shown. Additionally, a flyback diode 237 is connected across the motor 120 providing a circulating path for current generated by the motor 120, when the motor 120 is not being energized.

The control means 170 includes a programmable microprocessor 238 that performs a number of control functions. The microprocessor 238 can be purchased, for example, from Thompson Inc. as SGS Thompson 3870, model number MK 38P70. Under software control, the microprocessor 238 responds to a directional switch, not shown, which provides the desired directional orientation of the vehicle, i.e. forward or reverse. Thus, the microprocessor 238 controls the energization of the transistor 235 in response to the position of the directional switch.

The supply means 150 includes a power coupling element 239 connected intermediate the power source 130 and the motor 120. Preferably, the power coupling element 239 is a power transistor. The power coupling element 239 receives the control signal from the control means 170 and responsively delivers electrical energy from the power source 130 to the motor 120.

The sensing means 160 includes a reference voltage source 240. A voltage divider 245 is connected to the reference voltage source 240 and is adapted to produce a reference voltage signal. Preferably, the voltage divider 245 is a potentiometer which can be easily adjusted to give a reference voltage signal corresponding to a plurality of voltages. A current sensor 250 is inductively connected in series with the motor 120. The current sensor 250 is adapted to produce a shunting signal in response to the magnitude of the current flowing through the motor 120. More specifically, the current sensor 250 is a hall effect device which measures the intensity of the magnetic field intensity surrounding the conductor. The magnetic field intensity is directly proportional to the current flowing though the conductor. The current sensor 250 converts the field intensity to a voltage represented by the shunting signal. The current sensor 250 may be purchased from Honeywell Inc. as part number 91SS12-2. A comparator 255 is connected to the current sensor 250 via a positive terminal and to the voltage divider 245 via a negative terminal. The comparator 255 is adapted to produce the current signal in response to the magnitude of the shunting signal being greater than the magnitude of the reference voltage signal. Additionally, artisans can readily appreciate that the function of the voltage divider 245 and the voltage comparator 255 can be replaced by a microprocessor in which the reference voltage signal can be changed in software.

In the operation of the sensing means 160, assume that the reference voltage signal is set to a value which corresponds to the predetermined value. In the preferred embodiment of the present invention, the predetermined value corresponds to a magnitude of current flowing through the motor associated with a predetermined amount of heavy loading of the vehicle motor 120. If the magnitude of current flowing through the armature 210 of the motor 120 exceeds the predetermined value the comparator 255 delivers the current signal to the controller 170. For example, a motor 120 may be heavily loaded when the vehicle ascends a ramp or when the vehicle pulls out of a "pot-hole".

The generating means 140 includes means 260 for generating digital numbers representing the command signal. For example, the numbers are 4-bit digital numbers ranging from 0000 to 1111. Each digital number is a different desired motor speed command signal for the motor 120. For example, the number 0000 commands zero speed, and the number 1011 commands half speed and the number 1111 commands 90% of full or maximum speed of the motor 120. Under software control, the microprocessor 238 responds to the digital numbers by producing the control signal having a duty cycle responsive to the digital number. During normal vehicle operation (no speed control), the sixteen digital numbers or command signals in the range 0000–1111, correspond to sixteen different preselected duty cycles of the motor speed control signals which rotate the motor 120 at sixteen different speeds—assuming a constant motor load. Therefore, each command signal corresponds to a unique duty cycle of the control signal in a range between a minimum and upper maximum value. For example, the range between the minimum and upper maximum value is associated with duty cycles between the range of 0% to 90%. In the present example, the range of digital numbers from 0000 to 1111 in the binary coded decimal format (BCD) is used only for convenient illustration and could be any suitably coded representation having a number of increments consistent with the desired precision.

Under unique vehicle operations (a speed control condition), the control means 170 compares the command signal to a limit value and if the command signal is greater than the limit value, then the command signal will have no increasingly effect on the duty cycle of the control signal. Consequently, the range of the duty cycle of the control signal is limited—between a minimum and a predefined value. For example, the range between the minimum and predefined value is associated with a duty cycle between 0% and 50%. The limit value of the command signal and the range of the duty cycle of the control signal is preselected in the software of the microprocessor 238. Thus, the maximum allowable duty cycle of the control signal is limited to the predefined value which is associated with the limit value, regardless of the desired vehicle speed given by the command signal. For example, if the limit value corresponds to a digital value of 1011 which is associated with a predefined value of 50%, then any value of the command signal greater than the limit value will have essentially no effect as to the energization rate of the motor 120 being greater than 50%. Therefore, the limit value, and consequently the predefined value, correspond to a maximum desired motor speed and to a maximum desired vehicle speed. Thus, the speed of the vehicle is limited to a maximum desired vehicle speed—assuming a constant motor load. It is well known that energizing a motor with a predetermined pulse rate or duty cycle corresponds to a predetermined vehicle speed. Additionally, by knowing the desired vehicle speed and the loaded weight of the vehicle, one skilled in the art can determine the pulse rate of the motor mathematically using empirical formulation.

As one example, the generating means 140 is coupled to an accelerator pedal 265 via a linkage 270. The generating means 140 includes means 275 for converting positional information of the accelerator pedal 265 to any one of the digital numbers 0000–1111 in a well known manner.

During a speed control condition, when the accelerator pedal 265 is fully released or not depressed, the generation means 140 responds by producing the digital number 0000. The microprocessor 238 responds by producing a control signal with a duty cycle of 0% and responsively the motor 120 is deenergized. When the accelerator pedal 265 is depressed to, for example, a half-speed position, the generating means 140 delivers the number 1011 to the microprocessor 238. The microprocessor 238 responds by producing a control signal with a 50% duty cycle operating the motor 120 at half speed. When the accelerator pedal 265 is depressed to, for example, a three quarter-speed position, the generating means 140 delivers the control signal corresponding to the number 1101, for example, to the microprocessor 238. Assuming the limit value to be a digital number 1011, the control signal essentially has no effect and the microprocessor 238 delivers a control signal corresponding to the predefined value, 50% for example, to the motor 120. Thus the speed of the motor 120 is limited, and consequently the speed of the vehicle is limited as well.

Under exceptional vehicle operations (a heavily loaded vehicle motor 120) while the vehicle is under a speed control condition, the control means 170 receives the current signal and increases the duty cycle of the control signal by a predetermined amount beyond the predefined value in response to the command signal being greater than the limit value and the magnitude of the current signal being greater than the predetermined value. For example, when the accelerator pedal 265 is depressed to, for example, a three quarter-speed position, the generating means 140 delivers the number 1101 to the microprocessor 238. Assuming the motor 120 is heavily loaded, the current signal is produced by the comparator 255. The microprocessor 238 receives the current signal and in response to the magnitude of the command signal being greater than the limit value (assuming the limit value to be 1011), the microprocessor 238 increases the duty cycle of the control signal beyond the predefined value by a predetermined amount. For example, if the predefined value corresponds to a value of 50%, then the duty cycle of the control signal will be increased by an amount of 10% and consequently the control signal will have a duty cycle corresponding to a value of 60%.

During a high load operation it has been found advantageous to bypass the coupling element 239 via the bypass contactor 180 connected in parallel with the coupling element 239. A bypass contactor coil 270, which controls the state of the contacts 275, and a bypass transistor 280 which is controlled by the control means 170, are in series connection with the power source 130. When the transistor 280 is energized, the coil 270 energizes to change the state of the contacts 275 from that shown. When the transistor 280 is deenergized, the coil 270 deenergizes to return the contacts 275 to the normal state shown. In the instant embodiment of the present invention, the control means 170 closes the bypass contactor 180 in response to the duty cycle of the control signal being at the upper maximum value. Operation of the normally open bypass contactor 180 is effected by the microprocessor 238 under software control.

FIG. 3 is a flowchart of a computer program suitable for controlling the control system 100. Only the software routines required to implement one embodiment of the present invention are described herein. Sufficient detail is presented to allow one skilled in computer programming to write the required program to implement the flowchart for any common microprocessor. Upon beginning the flowchart of FIG. 3 at the block 300 labeled START, program control progresses through the following sequence:

In the decision block 305, the microprocessor 238 receives information relating to the accelerator pedal 265 position in the form of the speed command signal. The speed command signal is compared to the limit value to determine if the operator is requesting acceleration beyond the maximum desired vehicle speed. If the speed command signal is less than the limit value then control passes to the block 310, where the motor 120 is energized at the rate corresponding to the speed command signal. Thereafter control continues to loop though the blocks 305,310 until the operator attempts to accelerate past the maximum desired vehicle speed by depressing the accelerator pedal 265. Once acceleration has been requested beyond the maximum desired vehicle speed, a timer is decremented in the block 312 in each pass through the control loop, and control passes to block 314. During each pass the decision block 314 routes control to the decision block 315 as long as the timer has reached zero. Thus, if the operator is requesting that more power be delivered to the motor 120, the duty cycle of the control signal is allowed to remain at the preselected rate for only a preselected duration of time determined by the timer. Referring to Table 1, it can be seen that the timer is varied according to the present duty cycle. For example, at 60%–80% duty cycles the timer is set to 200 msec for each cycle and at 90% the timer is limited to 100 msec. Therefore, the motor 120 is delayed a predetermined amount of time before being energized to the next preselected rate thereby inhibiting "jerky" vehicle operation.

TABLE 1

| DUTY CYCLE (%) | TIMER (msec) |
|---|---|
| 0–50 | 250(total) |
| 60.00 | 200 |
| 70.00 | 200 |
| 80.00 | 200 |
| 90.00 | 100 |

In the block 315 the microprocessor 238 queries if the current signal is being produced by the comparator 255, which signifies that the vehicle motor 120 is loaded beyond a predetermined amount. If the current signal is being produced, then control passes to the blocks 317,320 where the duty cycle is increased to the next higher duty cycle value and the timer is set to the desired value. In the block 320 the microprocessor 238 increases the duty cycle of the control signal by a predetermined amount beyond the predefined value, preferably by 10%. If control continues in the loop 305,315,320 the duty cycle of the control signal will be increased up to a value corresponding to an upper maximum value. Once the upper maximum value has been reached, for example a 90% duty cycle, the microprocessor 238 responsively energizes the transistor 280, and consequently the bypass contactor 180 closes and the supply means 150 is bypassed.

If the motor 120 is not being loaded by at least a predetermined amount, then control passes to the decision block 325. In the block 325, the microprocessor 238 compares the duty cycle of the control signal to the predefined value. If the duty cycle of the control signal is greater than the predefined value, then control passes to the block 330. In the block 330, the microprocessor 238 decreases the duty cycle of the control signal by a predetermined amount. Preferably the predetermined amount is a value whereby the duty cycle is decreased back to the predefined value. This loop is desirable since the vehicle needs a higher duty cycle while ascending a ramp; and accordingly, the vehicle needs a lower duty cycle after reaching level ground in order for the vehicle to revert back to the maximum desired speed.

Adverting back to the block 325, if the duty cycle of the control signal is less than or equal to the predefined value then the control continues back to the start.

It should be recognized that the values shown herein are for illustrative purposes only and will vary according to the vehicle and application.

INDUSTRIAL APPLICABILITY

In the overall operation of the vehicle and the vehicle control system, assume, for example, that the accelerator pedal 265 is at a half-speed position. The generating means 140 produces the speed command signal associated with the digital number 1011. Consequently, the microprocessor 238 delivers the control signal with a 50% duty cycle to the coupling element 239 corresponding to half-speed. As a result, the motor 120 is energized to move the vehicle at half-speed.

Assume also that the vehicle is under a speed limit condition, the limit value is set to 1011, and the range of the duty cycle of the control signal is 0% to 50%—the minimum and predefined values, respectively. Furthermore, the 50% duty cycle corresponds to a maximum desired vehicle speed of 4 mph.

Then, for example, the vehicle ascends a ramp and the accelerator pedal 265 is depressed to a full speed position. The generating means 140 produces a speed command signal associated with the digital number 1111. Additionally, the comparator 255 produces the current signal since the motor 120 becomes heavily loaded due to the vehicle ascending the ramp. Consequently, the microprocessor 238 receives the current signal and the command signal, compares the command signal to the limit value, and increases the duty cycle of the command signal by a predetermined amount, 10% for example, which energizes the motor 120 at a rate of 60%. Eventually, the duty cycle will be increased up to the upper maximum value which is preferably set to 90%. Each time the duty cycle is increased, the microprocessor 238 allows the duty cycle to continue for a preselected duration. This allows the vehicle to operate smoothly during each increasing transition of the duty cycle. After the upper maximum value has been reached, the microprocessor 238 closes the bypass contactor 180 energizing the motor 120 at full power.

Once the vehicle reaches level ground, the motor 120 is no longer being heavily loaded and responsively the comparator 255 stops the delivery of the current signal. Consequently the microprocessor 238, decreases the duty cycle of the command signal back to the predefined value allowing the vehicle to be operated at the maximum desired speed.

The above discussion describes a control system for a vehicle that allows the vehicle to be limited to a maximum desired speed under exceptional conditions. Furthermore, the control system 100 can be implemented on a vehicle without modification to the existing circuitry resulting in a cost effective and robust system.

Other aspects, objects and advantages of the present invention can be obtained from a study of the drawings, the disclosure and the appended claims.

We claim:

1. A motor speed control system for a vehicle, said control system including an electric motor connected to a controllable supply means for delivering electrical energy to said motor in response to a control signal, comprising:
    sensing means for producing a current signal in response to the magnitude of the current flowing through said motor being greater than a predetermined value;
    generating means for producing a command signal in response to a desired vehicle speed;
    control means for receiving said command signal and responsively delivering a pulse width modulated control signal to said controllable supply means, said control signal having a duty cycle in a range between a minimum and predefined value; and
    wherein said control means receives said current signal and increases the duty cycle of said control signal by a predetermined amount beyond said predefined value in response to said received current signal.

2. A speed control system, as set forth in claim 1, wherein said control means decreases the duty cycle of said control signal by said predetermined amount in response to the absence of said current signal and the duty cycle of said control signal being greater than said predefined value.

3. A speed control system, as set forth in claim 1, wherein said command signal is a digitally coded signal.

4. A speed control system, as set forth in claim 1, wherein said predefined value corresponds to a maximum desired vehicle speed.

5. A speed control system, as set forth in claim 4, wherein said control means compares said command signal to a limit value and increases the duty cycle of said control signal by said predetermined amount beyond said predefined value in response to said command signal being greater than said limit value and in response to said received current signal.

6. A speed control system, as set forth in claim 5, wherein said limit value corresponds to said maximum desired vehicle speed.

7. A speed control system, as set forth in claim 1, wherein said sensing means includes:
    a reference voltage source;
    a voltage divider being connected to said voltage source and being adapted to produce a reference voltage signal corresponding to said predetermined value;
    a current sensor being connected in series to said motor and being adapted to produce a shunting signal;
    a comparator having positive and negative terminals, said positive terminal being connected to said current sensor and said negative terminal being connected to said voltage divider, said comparator being adapted to produce said current signal in response to the magnitude of said shunting signal being greater than the magnitude of said reference voltage signal.

8. A motor speed control system for a vehicle, said control system including an electric motor, a power source and a reference voltage source, comprising:

a power coupling element connected to and between said motor and said power source, and adapted to controllably deliver electrical energy from said power source to said motor;

a voltage divider being connected to said reference voltage source and being adapted to produce a reference voltage signal;

a current sensor connected in series with said motor, said current sensor being adapted to produce a shunting signal in response to the magnitude of the current flowing through said motor;

a comparator having positive and negative terminals, said positive terminal being connected to said current sensor and said negative terminal being connected to said voltage divider, said comparator being adapted to produce a current signal in response to the magnitude of said shunting signal being greater than the magnitude of said reference voltage signal;

an accelerator pedal movable to a plurality of speed positions;

generating means for producing a command signal in response to said accelerator pedal speed position;

control means for receiving said command signal and responsively delivering a pulse width modulated control signal to said power coupling element, said control signal having a duty cycle in a range between a minimum and predefined value; and wherein said control means receives said current signal and increases the duty cycle of said control signal by a predetermined amount beyond said predefined value in response to receiving said current signal.

9. A speed control system, as set forth in claim 8, wherein said control means decreases the duty cycle of said control signal by said predetermined amount in response to the duty cycle of said control signal being greater than said predefined value and in the absence of receiving said current signal.

10. A speed control system, as set forth in claim 8, wherein said control means compares said command signal to a limit value and increases the duty cycle of said control signal by said predetermined amount beyond said predefined value in response to said command signal being greater than said limit value and in response to receiving said current signal.

11. A speed control system, as set forth in claim 8, wherein said control means includes a programmable microprocessor.

12. A speed control system, as set forth in claim 8, including a bypass contactor connected in parallel with said power coupling element.

13. A speed control system, as set forth in claim 12, wherein said control means closes said bypass contactor in response to the duty cycle of said control signal being at an upper maximum value.

14. A method for controlling the speed of a vehicle having an electric motor, a bypass contactor and a power coupling element, said bypass contactor being connected in parallel with said power coupling element, comprising the steps of:

producing a current signal in response to the magnitude of the current flowing through said motor being greater than a predetermined value;

producing a command signal in response to a desired vehicle speed;

receiving said command signal and responsively delivering a pulse width modulated control signal to said power coupling element, said control signal having a duty cycle in a range between a minimum and a predefined value; and receiving said current signal and increasing the duty cycle of said control signal by a predetermined amount beyond said predefined value in response to said received current signal.

15. A method, as set forth in claim 14, including the step of closing said bypass contactor in response to the duty cycle of said control signal being equal to an upper maximum value.

16. A method, as set forth in claim 14, including the step of decreasing the duty cycle of said control signal by said predetermined amount in response to the absence of said current signal and the duty cycle of said control signal being greater than said predefined value.

17. A method, as set forth in claim 16, including the step of comparing said command signal to a limit value and increasing the duty cycle of said control signal by said predetermined amount beyond said predefined value in response to said command signal being greater than said limit value and in response to said received current signal.

18. A motor speed control system for a vehicle, said control system including an electric motor connected to a controllable supply means for delivering electrical energy to said motor in response to a control signal, comprising;

a reference voltage source;

a voltage divider being connected to said voltage source and being adapted to produce a reference voltage signal corresponding to a predetermined value;

a current sensor being connected in series to said motor and being adapted to produce a shunting signal;

a comparator having positive and negative terminals, said positive terminal being connected to said current sensor and said negative terminal being connected to said voltage divider, said comparator being adapted to produce a current signal in response to the magnitude of said shunting signal being greater than the magnitude of said reference voltage signal;

generating means for producing a command signal in response to a desired vehicle speed;

control means for receiving said command signal and responsively delivering a pulse width modulated control signal to said controllable supply means, said control signal having a duty cycle in a range between a minimum and predefined value; and wherein said control means receives said current signal and increases the duty cycle of said control signal by a predetermined amount beyond said predefined value in response to said received current signal.

* * * * *